(12) United States Patent
Vella et al.

(10) Patent No.: US 10,955,721 B1
(45) Date of Patent: Mar. 23, 2021

(54) MULTI-ORDER, TUNABLE FABRY-PEROT ETALON FILTER WITH WAVELENGTH DOWN-SELECTOR

(71) Applicant: Government of the United States as represented by the Secretary of the Air Force, Wright-Patterson AFB, OH (US)

(72) Inventors: Jarrett H. Vella, New Carlisle, OH (US); John H. Goldsmith, Dayton, OH (US); Mohammad I. Vakil, Beavercreek, OH (US); John S. Derov, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 286 days.

(21) Appl. No.: 16/283,932

(22) Filed: Feb. 25, 2019

(51) Int. Cl.
*G02F 1/21* (2006.01)

(52) U.S. Cl.
CPC .............. *G02F 1/218* (2013.01); *G02F 1/213* (2021.01); *G02F 2202/101* (2013.01)

(58) Field of Classification Search
CPC ..... G02F 1/218; G02F 1/213; G02F 2202/101
See application file for complete search history.

(56) References Cited

U.S. PATENT DOCUMENTS

| | | |
|---|---|---|
| 4,240,696 A | 12/1980 | Tracy et al. |
| 5,321,539 A | 6/1994 | Hirabayashi et al. |
| 5,361,155 A | 11/1994 | Chiaroni et al. |
| 6,545,739 B1 | 4/2003 | Matsumoto et al. |
| 6,888,661 B1 | 5/2005 | Islam et al. |
| 9,052,535 B1 | 6/2015 | Zortman et al. |
| 2013/0170011 A1* | 7/2013 | Cho ............. G02B 26/001 359/263 |

* cited by examiner

*Primary Examiner* — Joseph P Martinez
(74) *Attorney, Agent, or Firm* — AFMCLO/JAZ; Matthew D. Fair

(57) ABSTRACT

In accordance with various embodiments of the disclosed subject matter, a system, device and method for an electrically tunable wavelength selection filter comprising a wavelength selection filter portion having a plurality of alternating thin films of two dielectric materials with a thin film capacitor displacing one pair of alternating thin films, and an order sorting filter portion electrically isolated from but proximate the wavelength selection filter and having a plurality of alternating thin films of two dielectric materials where one of the dielectric materials exhibits a voltage-dependent refractive index. Independently controlling the capacitor charging voltage and the voltage across the order sorting filter enables selective transmission of narrow spectral lines across a desired frequency region.

18 Claims, 6 Drawing Sheets

MULTI-ORDER, TUNABLE FABRY-PEROT ETALON FILTER WITH WAVELENGTH DOWN-SELECTOR

GOVERNMENT INTEREST

The invention described herein may be manufactured and used by or for the Government of the United States for all governmental purposes without the payment of any royalty.

FIELD OF THE DISCLOSURE

The present invention generally relates to Fabry-Perot etalon filters with a voltage tunable defect cavity.

BACKGROUND

Contemporary optical bandpass filters generally function by absorption or reflection. Standard colored glass filters, for example, absorb incident frequencies and pass only a selected frequency band. Reflective bandpass filters are generally dielectric stacks where the thickness and refractive index of alternating layers of dielectric materials is chosen so that a specific set of frequencies is transmitted through the thin film stack, while all others are reflected back into space. When one or more non alternating materials different in composition, refractive index, and thickness, from the alternating materials is inserted into the stack, the structure becomes a Fabry-Perot etalon. This structure then transmits a specific, narrow range of frequencies, within the reflective region. The etalon becomes tunable when a mechanism alters the refractive index of the non-alternating material or when the optical angle of incidence is changed.

Unfortunately, existing tunable bandpass filters suffer from a number of compromises in terms of performance, mechanical requirements and the like. For example, schemes in which the angle of the filter is changed relative to a propagating beam of light require careful optical alignment and rotation mechanisms which degrade and break down over time. When one of the alternating materials in the dielectric stack exhibits a voltage tunable refractive index, each layer in the stack must have a ground and signal electrode. This significantly increases the fabrication and operational complexity of the device. Liquid crystal Fabry-Perot etalons are quite useful, although the liquid crystal component must be hermetically sealed for proper operation, which increases the cost and complexity of such filters. Insertion of electronic components such as a p-n diode junction do show good wavelength tunability, but require high quality (often epitaxial), crystalline materials to be optimally effective.

Accordingly, there is a need in the art for a Fabry-Perot etalon, reflective bandpass filter that exhibits excellent wavelength tunability, simple fabrication and no moving parts.

SUMMARY OF THE INVENTION

Various deficiencies in the prior art are addressed below by a system, device and method for an electrically tunable wavelength selection filter comprising a wavelength selection filter portion having a plurality of alternating thin films of two dielectric materials with a thin film capacitor displacing one pair of alternating thin films, and an order sorting filter portion electrically isolated from but proximate the wavelength selection filter and having a plurality of alternating thin films of two dielectric materials where one of the dielectric materials exhibits a voltage-dependent refractive index. Independently controlling the capacitor charging voltage and the voltage across the order sorting filter enables selective transmission of narrow spectral lines across a desired frequency region.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
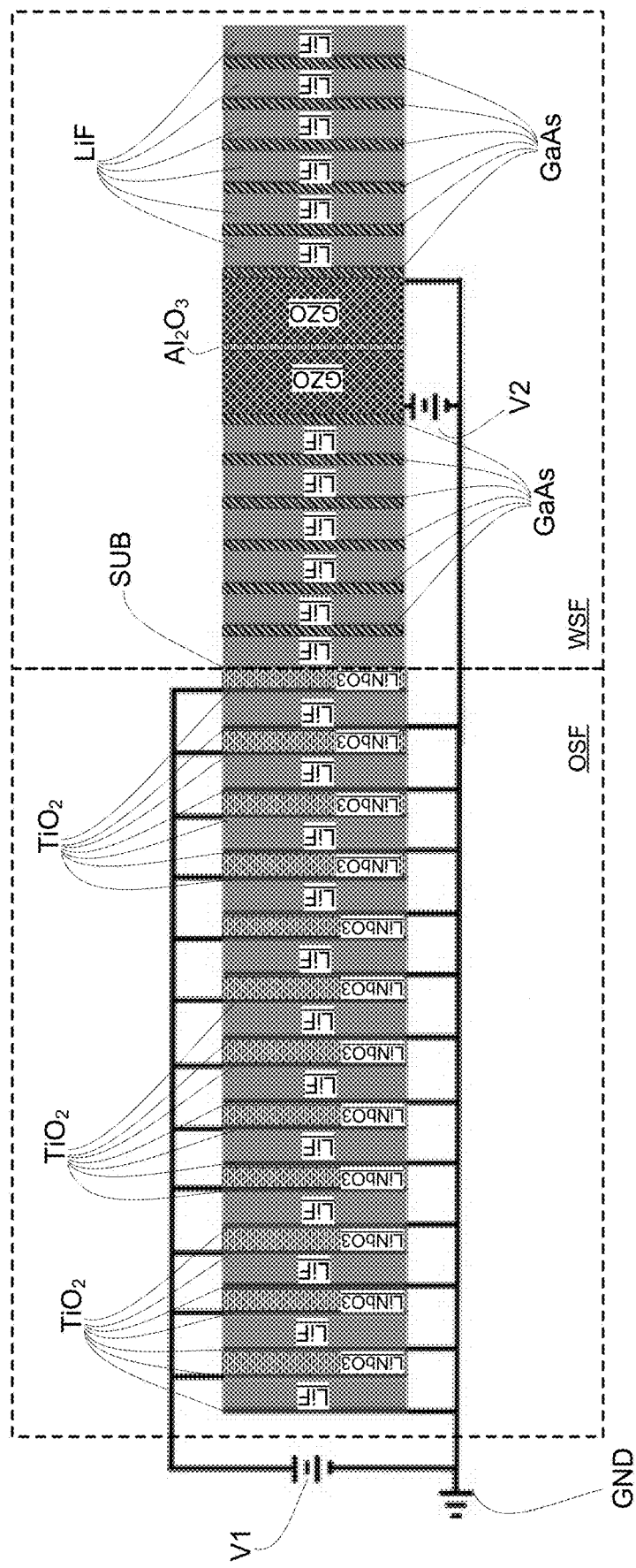
FIG. 1 depicts an electrically tunable bandpass filter according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments such as a tunable Fabry-Perot etalon filter ("tunable filter") address the need in the art for an electrically tunable bandpass filter without moving parts, that exhibits wide wavelength tunability, and with simple fabrication processes. In some embodiments, the tunable filter is composed of two parts. Specifically, various embodiments comprise an order sorting filter fabricated either directly on top of a wavelength selection filter (or on the other side of a substrate of the wavelength selection filter) comprising, illustratively, an epitaxial lithium fluoride-lithium niobate (or sapphire-lithium niobate) dielectric mirror wherein tuning of transmissive wavelengths may be achieved via independently adjustable DC voltages applied to each of the order sorting filter and the wavelength selection filter. In various embodiments, the wavelength selection filter is fabricated by sputter deposition, after which the order sorting filter is fabricated thereon.

The first part the tunable filter is a wavelength selection filter. A dielectric material is proximate a substrate transparent for the frequency region of interest. A second dielectric material is proximate the first, but whose refractive index is different from the first material and the substrate. In some embodiments, a second plurality of the first and second dielectric materials is present, creating an alternating stack of the first and second dielectric materials. One electrode of a capacitor is proximate the second dielectric material. The other capacitor electrode is proximate to a second instantiation of the second dielectric material. This creates a capacitor sandwiched between separate instantiations of the second dielectric material. A second instantiation of the first dielectric material is proximate the second instantiation of the second dielectric material. In some embodiments, a second plurality of the second and first dielectric material is present, creating an alternating stack of the second and first dielectric materials on the other side of the capacitor. In some embodiments, the capacitor electrodes are formed from a conductive material transparent to the frequency region of interest. In some embodiments, the capacitor electrodes are metals, semiconductors, and other optically opaque materials placed in the nodal electric field of the alternating first and second materials. The capacitor electrodes are separated by a dielectric material transparent to the frequency of interest.

The second part of the tunable filter is an order sorting filter. In some embodiments, the first dielectric material is proximate the final layer of the wavelength selection filter. In some embodiments, the order sorting filter is on the same substrate as the wavelength selection filter, but on the other side of the substrate. A conductive material is proximate the first dielectric material. A second dielectric material whose refractive index is different from the first is proximate the conductive material. A second instantiation of the conductive material is proximate the second dielectric material. In some embodiments, a second plurality of the first dielectric material is proximate the second instantiation of the conductive material, followed by the second dielectric material, and a third instantiation of the conductive material. This forms an alternating stack of the first dielectric, conductor, second dielectric, and conductor. In some embodiments, the conductive material is transparent to the frequency region of interest. In some embodiments, the conductive material is a metal, semiconductor, or another optically opaque material placed in the nodal electric field of the alternating first and second materials.

In some embodiments, the thickness, l, of any alternating dielectric material follows (Eq. 1), where $\lambda$ is the wavelength corresponding to the frequency of interest, and n is the refractive index of the particular dielectric material at $\lambda$.

$$l = \frac{\lambda}{4n} \tag{Eq. 1}$$

The total thickness of the capacitor, including electrodes and the dielectric layer, is given by (Eq. 2) and can be any integer multiple, m, of $\lambda$.

$$l = \frac{m\lambda}{2n} \quad \text{(Eq. 2)}$$

The thickness of the conductive material in the order sorting filter is just enough to be electrically conductive, 50 nm or less. The substrate is any material of any thickness capable of mechanically supporting the thin film structure. In some embodiments, the region of interest may comprise $\lambda$=1.4 um to 2.4 um.

Finally, embodiments of the invention additionally provide a system, comprising an electrically tunable Fabry-Perot etalon bandpass filter and a voltage source. In some embodiments, the system comprises a wavelength selection filter and an order sorting filter. Each filter component may be connected to its own voltage source and a common ground.

Thus, various embodiments comprise an electrically tunable filter device comprising a wavelength selection filter (WSF) and an order sorting filter (OSF), where the WSF consists of a plurality of alternating thin films of two dielectric materials with a thin film capacitor displacing one pair of alternating thin films, and where the OSF is proximate but electrically isolated from the WSF, and consists of a plurality of alternating thin films of two dielectric materials, one of which exhibits a voltage-dependent refractive index. Independently controlling the capacitor charging voltage and the voltage across the order sorting filter enables selective transmission of narrow spectral lines across a desired frequency region.

FIG. 1 graphically depicts a cross-section view of an electrically tunable bandpass filter according to an embodiment. Specifically, FIG. 1 depicts a cross-section of an electrically tunable bandpass filter system comprising a wavelength selection filter WSF combined with an order sorting filter OSF, wherein the WSF and OSF are constructed on opposite sides of a substrate SUB. It is noted that the WSF, OSF and SUB may be implemented using different topologies, configurations and/or materials that described herein.

Generally speaking, the embodiment of FIG. 1 comprises an electrically tunable filter system two DC power supplies tied to a common ground, with a first DC power supply V1 providing a control signal to the order sorting filter (OSF) and a second DC power supply V2 providing a control signal to the wavelength selection filter (WSF) to effect, thereby, independent control of the filtering characteristics of the OSF and WSF in accordance with the embodiments.

The WSF is depicted as comprising of a plurality (illustratively 12 pairs) of alternating thin films of two dielectric materials with a thin film capacitor displacing one pair of alternating thin films. The OSF is proximate the wavelength selection filter, but electrically isolated. The OSF is depicted as comprising a plurality (illustratively 12 pairs) of alternating thin films of two dielectric materials, wherein one of the dielectric materials in the OSF exhibits a voltage-dependent refractive index. Independently controlling the capacitor charging voltage of the WSF and the voltage across the OSF enables selective transmission of narrow spectral lines across a desired frequency region. One embodiment utilizes a lithium fluoride-lithium niobate OSF and a lithium fluoride-gallium arsenide WSF with a gallium zinc oxide-alumina-gallium zinc oxide transparent capacitor.

The order sorting filter may be implemented in accordance with, illustratively, the optical filter topologies described in U.S. Pat. No. 4,240,696. Briefly, the disclosed optical filter comprises a plurality of adjacent layer pairs, each pair having an incident and an emergent surface and including a first dielectric layer having a thickness t and a refractive index n, a second dielectric layer, adjacent to the first layer, having a thickness t and a refractive index n, and a control electrode disposed between and in electrical contact with the layers. The filter further includes a plurality of ground electrodes disposed on the layer pairs to electrically contact each incident and emergent surface, a source of electric potential, and a switch for connecting the source between the control electrodes and the ground electrodes, whereby light having a wavelength A=4nt will be reflected by the filter upon closing the switch and thereby applying the electric potential in opposite directions across the first and second layer pairs. The plurality of layer pairs may include m layer pairs, with the thickness of each dielectric layer in the ith pair (i=1, 2, 3 ... m) being ti, such that nti=A,/4, the filter thereby being adapted to reflect light having wavelength in the range Ai, Az, AJ ... Am.

Figures 2A, 2B, 2C:
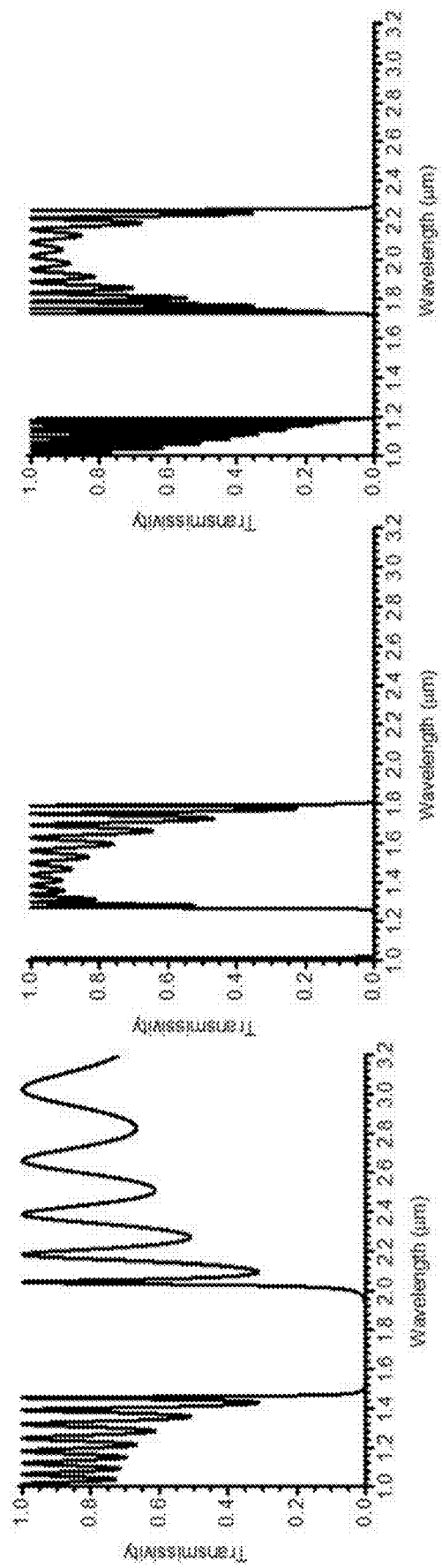
FIG. 2A graphically depicts transmission spectrum of an exemplary order sorting filter under a DC electrical bias of 0V.
FIG. 2B graphically depicts transmission spectrum of an exemplary order sorting filter under a DC electrical bias of 1500 V.
FIG. 2C graphically depicts transmission spectrum of an exemplary order sorting filter under a DC electrical bias of 3000 V.

As depicted in FIG. 1, the OSF comprises a lithium fluoride (LiF)-lithium niobate ($LiNbO_3$) dielectric mirror, where the LiF—$LiNbO_3$ pair of films is repeated twelve times. In between the LiF and $LiNbO_3$ is a titanium dioxide ($TiO_2$) thin film. When an alternating stack of 308 nm thick LiF and 193 nm thick $LiNbO_3$ films is bound on either end by 50 nm $TiO_2$, a dielectric mirror is formed. The thickness of the various dielectric materials may be selected in accordance with Eq. 1. With no DC bias applied, the dielectric mirror reflects every wavelength between $\lambda$=1.45-2.04 μm (FIG. 2A). This corresponds to the photonic bandgap of a standard dielectric mirror. When a DC voltage of 1500 V is applied to the order sorting filter, the reflection region changes to $\lambda$=1.27-1.78 μm (FIG. 2B). Increasing the DC voltage to 3000 V further alters the transmission spectrum of the mirror (FIG. 2C); two highly reflective regions form, $\lambda$=1.21-1.72 μm and $\lambda$=2.28-4.49 μm.

Lithium niobate is a standard electro-optic crystal that exhibits a strong electric field-dependent refractive index. In the SWIR region, the material is optically lossless, and the refractive index can be varied from n=2.21 to n=5.19 depending on the applied electric field. In the solid state, LiF is a low refractive index dielectric, also with low optical losses in the SWIR region. Lithium fluoride exhibits a negligible SWIR electro-optic effect when compared to lithium niobate. In its un-annealed form, $TiO_2$ is a transparent, conductive film; in this structure, it acts as the ground electrodes (i.e., $TiO_2$ electrodes depicted in FIG. 1 as connected to power supply ground GND) and signal electrodes (i.e., $TiO_2$ electrodes depicted in FIG. 1 as connected to first DC power supply V1) that are used to bias the LiF—$LiNbO_3$ dielectric mirror. Application of 1500 V DC increases the refractive index of $LiNbO_3$ from 2.21 to 3.70 and changes the impedance of the thin film stack to infrared radiation. Regions where there is a large impedance miss-match to free space are reflected, and in regions where the impedance is matched (or nearly so), infrared radiation is transmitted. By controlling the applied DC voltage to the LiF—$LiNbO_3$ dielectric mirror, wavelength regions in the $\lambda$=1.4-2.4 μm span can be selectively transmitted; in this way, the stack acts as an order sorting filter.

Wavelength Selection Filter

The disclosed wavelength selection filter comprises, illustratively, a LiF—GaAs (gallium arsenide) dielectric mirror with a five atom percent gallium-zinc oxide (GZO)-aluminum oxide ($Al_2O_3$)-GZO capacitor inserted into the middle of the dielectric mirror. The 335 nm thick LiF and 130 nm thick GaAs film pair is repeated six times and is governed by (Eq. 1). A GZO-Al$_2$O$_3$-GZO capacitor follows, consisting of two GZO films 665 nm thick separated by a 100 nm thick Al$_2$O$_3$ film (Eq. 2, m=14). A second set of six GaAs—LiF film pairs completes the wavelength selection filter.

Figure 3B:
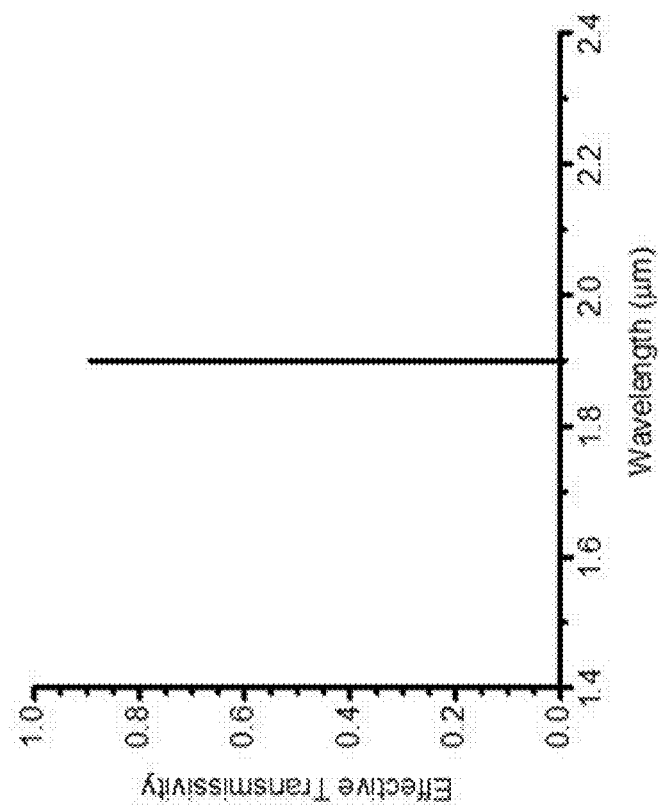
FIG. 3B graphically depicts transmission spectrum of an exemplary OSF/WSF tunable filter, when the order sorting filter has down-selected one wavelength band to transmit.
Figure 3A:
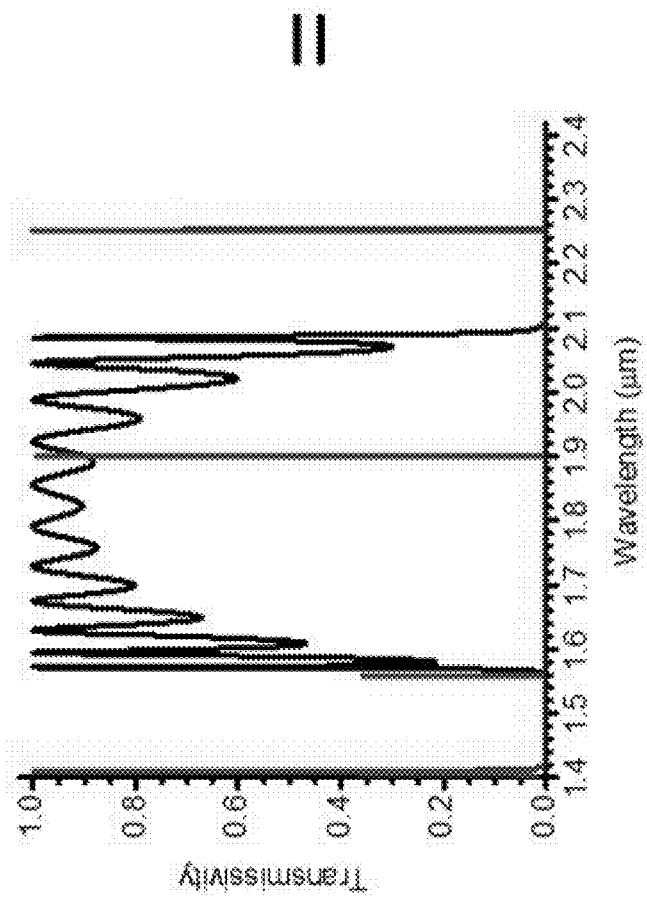
FIG. 3A graphically depicts a combination of the transmission spectra of the order sorting filter under a DC bias of 2500 V with the wavelength selection filter under a DC bias of 50 V.

FIG. 3A provides an example of the transmission spectra of the wavelength selection- and order sorting-filters operating simultaneously. Under an applied DC bias of 50 V, four spectral lines are transmitted through the wavelength selection filter: 1.41 µm, 1.56 µm, 1.90 µm, and 2.25 µm. The origin of the four transmission wavelengths will be discussed later. When the order sorting filter is biased at 2500 V, only the 1.90 µm wavelength is transmitted; the other three are reflected back into space. In the λ=1.4-2.4 µm region, a λ=1.90 m bandpass filter is effectively created (FIG. 3B). By varying the applied DC voltage of the order sorting- and wavelength-selection filters, one stack of films 13.1 µm thick acts as a tunable bandpass filter for the λ=1.4-2.4 m region.

Figure 4:
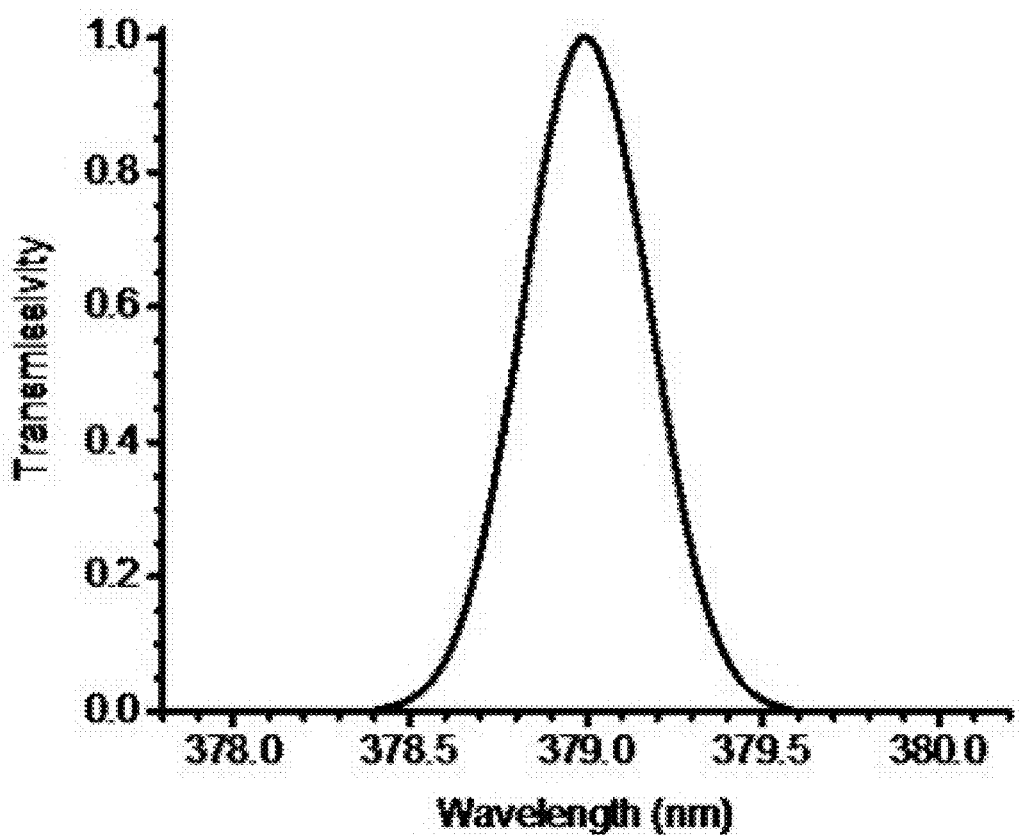
FIG. 4 graphically depicts exemplary WSF transmission spectrum in the case of an expansion of the first order transmission spectrum (m=1) of the wavelength selection filter.

The transmission spectrum of the tunable filter (depicted in FIG. 3B) is very narrow (seeming to appear as a straight line) with a Gaussian transmission peak with FWHM=0.420 nm (FIG. 4). This is a result of the large refractive index dispersion of the GZO material, as will be described in more detail below.

FIG. 5A-D illustrates the electric tunability of the bandpass filter created by combining an order sorting filter with a wavelength selection filter. When the wavelength selection filter is biased at 30 V and the order sorting filter is biased at 1500 V DC (30 V/1500V bias), the stack in FIG. 1 acts as a λ=1.443 µm bandpass filter. Under a 40 V/2000 V bias, the bandpass wavelength changes to λ=1.503 µm; when the bias changes to 50 V/2500 V, λ=1.900 µm is transmitted, and when the filter experiences 0 V/0 V, the stack acts as a λ=2.392 µm bandpass filter. These are only examples, and any combination of bias voltages can be selected to tune the filter transmission between λ=1.4-2.4 µm.

Preferably, the materials composing the wavelength selection filter should be optically lossless to the extent possible to maximize the filter transmissivity. Beyond 960 nm, GaAs is lossless; five atom percent GZO exhibits a small optical absorption, Al$_2$O$_3$, and LiF are completely transparent in the SWIR region. Tunability of the wavelength selection filter, and the FWHM of the bandpass region, arises from strong modulations of the refractive index near the GZO bandgap induced by the application of external electric fields.

Gallium zinc-oxide is a transparent conductor, and under five atom percent Ga doping level, has high SWIR transparency. Combined with Al$_2$O$_3$, the materials form an optically transparent capacitor, the optical thickness of which determines the transmission of the wavelength selection filter. The impedance, Z, of a capacitor is inversely related to its capacitance, C, and the frequency, ω, given by (Eq. 3).

$$Z = \frac{1}{\omega C} = \sqrt{\frac{\mu}{\varepsilon}} \quad \text{(Eq. 3)}$$

The square root of the ratio between a material's permeability, µ, and permittivity, ε, also describes its impedance. As the capacitor in the wavelength selection filter charges, the impedance decreases. Following (Eq. 1), this causes a corresponding increase in E.

In some instances, it may be desirable to operate the capacitor beyond its dielectric strength. This would result in a standing electrical polarization forming across both electrodes, substantially altering the impedance of the device, such as described below with respect to Eq. 3a:

$$Z = \lim_{C \to 0}\left(\frac{1}{\omega C}\right) \quad \text{(Eq. 3a)}$$

Dielectric mirrors are alternating layers of thin films with contrasting refractive indices. When the film thickness, l, of each layer satisfies (Eq. 4), there is a large impedance mismatch between free space and the stack of alternating films. Within this region, the stack is highly reflective and acts as a mirror.

$$l = \frac{\lambda}{4\sqrt{\varepsilon}} \quad \text{(Eq. 4)}$$

However, inclusion of a third, non-alternating material within the stack results in the formation of a narrow spectral band with strong impedance matching to free space within the reflective region when (Eq. 5) is satisfied, where m is an integer.

$$l = \frac{m\lambda}{2\sqrt{\varepsilon}} \quad \text{(Eq. 5)}$$

Considering (Eq. 3) and (Eq. 5), a change in the capacitance of the third, non-alternating material changes its refractive index (n≈√ε). The film thickness l is fixed, so (Eq. 5) is only satisfied when A changes; in this way, the charge on the GZO-Al$_2$O$_3$-GZO capacitor causes the spectral bands transmitted by the wavelength selection filter to move. These materials do not have strict crystallographic requirements and can be deposited using any convenient method.

Another consequence of (Eq. 5) is that for a given film thickness, the filter will be impedance matched at integer multiples of the incident wavelength. Voltage-induced changes in refractive indices are strongest near a material's bandgap. For five atom percent GZO, the bandgap is 379 nm (m=1). Designing a dielectric mirror so that the reflective region overlaps the m=14 transmission band of the capacitor enables strong refractive index modulations in a region where ordinarily, they would be very small.

This distinguishes the present invention from all other prior art where m=1. Additionally, the multiple transmission peaks in the photonic bandgap extend the effective wavelength tunability of the filter, since each peaks shifts the same amount as the capacitor charges.

Figure 6C:
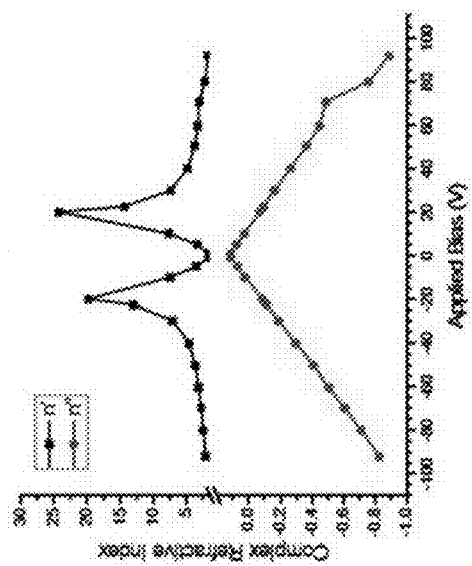
FIG. 6C graphically depicts a change in complex refractive index of the active component of the wavelength selection filter affected by the application of various DC bias levels (m=1) causing dielectric breakdown.
Figure 6B:
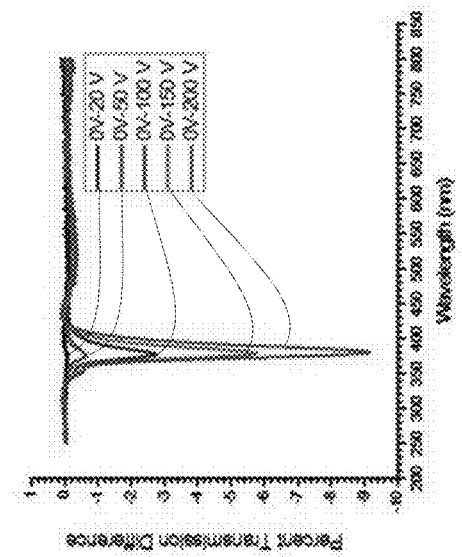
FIG. 6B graphically depicts a difference in transmission spectra of the active component of the wavelength selection filter affected by the application of various DC bias levels (m=1)
Figure 6A:
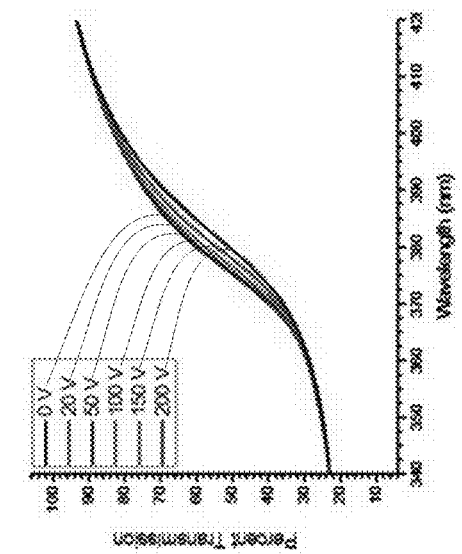
FIG. 6A graphically depicts transmission spectra of the active component of the wavelength selection filter affected by the application of various DC bias levels (m=1)

FIG. 6A shows the transmission spectrum of a GZO-Al$_2$O$_3$-GZO capacitor with 63 nm thick GZO films (m=1) near the GZO bandgap. FIG. 6B is the corresponding difference in transmission spectra for the same film. As the applied DC voltage increases beyond the dielectric strength of the capacitor, the change in percent transmission is mainly concentrated at the GZO bandgap, although slight modulations can be found at other wavelengths (for example, λ=529 nm).

The corresponding change in complex refractive index for the same film (FIG. 6C) indicates that the net n' of the capacitor increases to a maximum of 24 at an applied bias of +20 V DC. This value is well beyond the dielectric strength of a 100 nm thick Al$_2$O$_3$ film (1.34 V). Beyond ±40 V DC, further changes in the transmission spectrum are driven by decreases in n" of the device.

Figure 7:
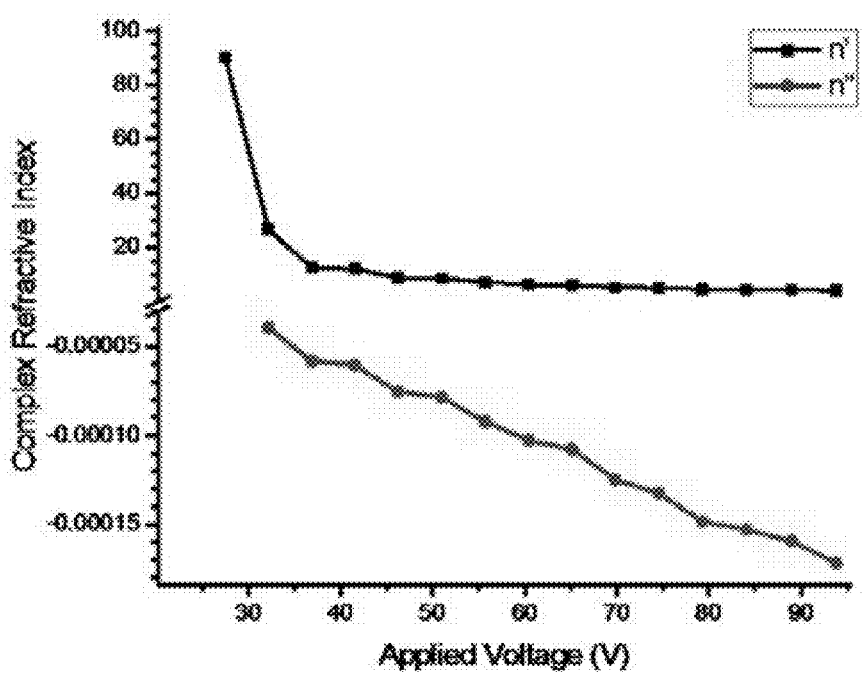
FIG. 7 graphically depicts a change in complex refractive index of the active component of the wavelength selection filter affected by the application of various DC bias levels (m=5000) that do not cause dielectric breakdown.
Figure 5A:
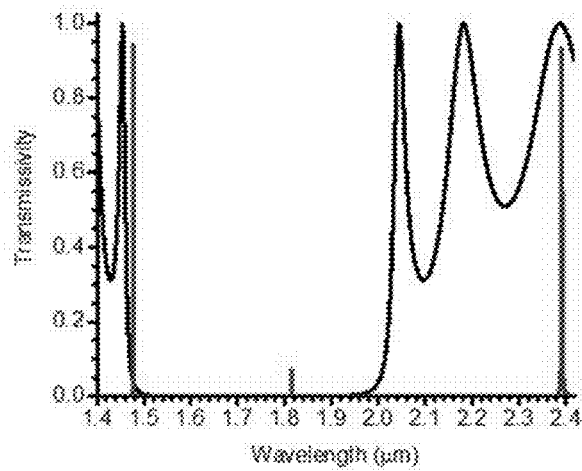
FIG. 5A graphically depicts a combination of the transmission spectra of the order sorting filter (black) under a DC bias of 1500 V with the wavelength selection filter (red) under a DC bias of 30 V.
Figure 5B:
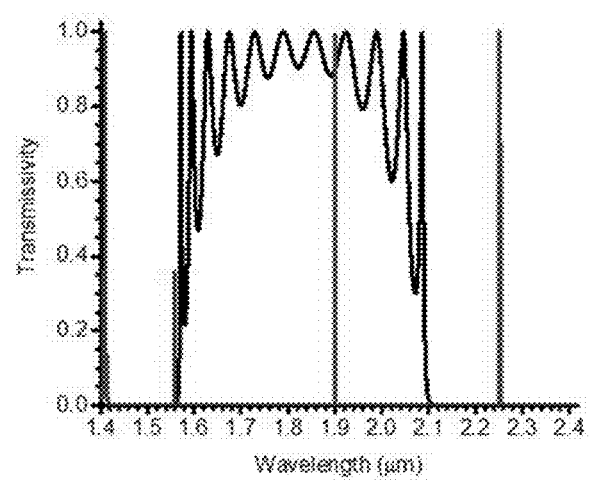
FIG. 5B graphically depicts a combination of the transmission spectra of the order sorting filter (black) under a DC bias of 2000 V with the wavelength selection filter (red) under a DC bias of 40 V.
Figure 5C:
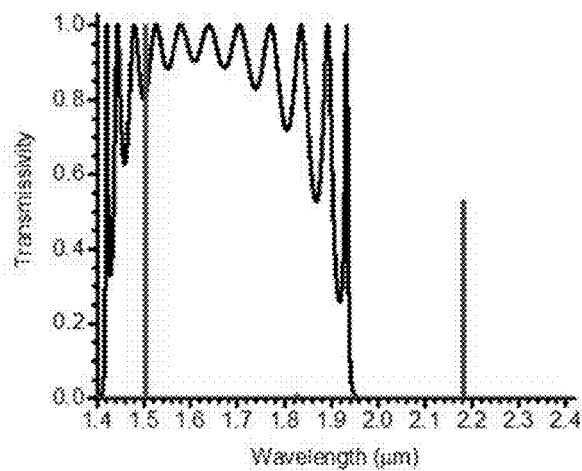
FIG. 5C graphically depicts a combination of the transmission spectra of the order sorting filter (black) under a DC bias of 2500 V with the wavelength selection filter (red) under a DC bias of 50 V.
Figure 5D:
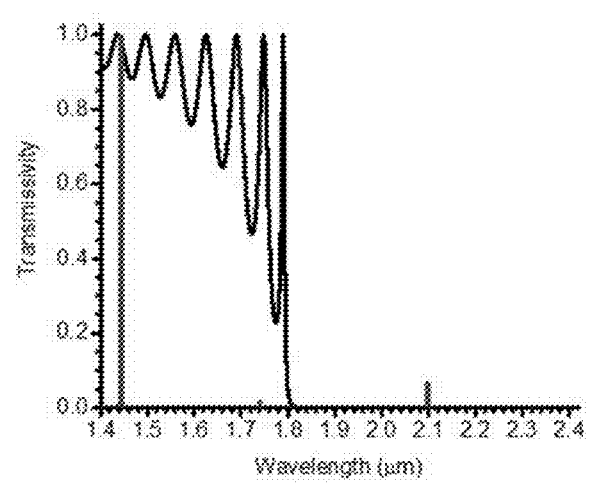
FIG. 5D graphically depicts a combination of the transmission spectra of the order sorting filter (black) under a DC bias of 0 V with the wavelength selection filter under (red) a DC bias of 0 V.

FIG. 7 shows the change in complex refractive index when a 500 m thick c-plane sapphire wafer is used as the dielectric, with m=1 GZO electrodes on either side. The breakdown voltage for this wafer is 6.7 kV, so the device functions as a true capacitor in the absence of dielectric breakdown. The minimum detectable change in refractive index occurred at 27.5 V mainly because of instrumental noise considerations. The net complex refractive index of the capacitor rose to a presumed maximum of n'=90 at 27.5 V, after which it eventually leveled off at n'=5.8.

These two examples demonstrate situations in which the device would be operated in or out of dielectric breakdown mode. For filters operating at very long wavelengths where the dielectric thickness is several multiples of m=1, suitable changes in n' can be obtained without dielectric breakdown. For much thinner films and shorter wavelengths, dielectric breakdown of the capacitor really cannot be avoided, so this mode is the prevailing mechanism for the refractive index modulation. It is noted that a thickness of m>1 for a defect cavity is relatively large and finds utility within the context of the structures defined herein. Other structures, such as a capacitor having a refractive index beyond what is described within the context of the various embodiments may enable embodiments in which the order sorting filter is less important or eliminated.

The time at which the filter can change wavelengths depends on the charging time (discharging time) of the capacitor. The capacitor in this embodiment consists of a dielectric separating two parallel electrodes. This can be modeled as a parallel plate capacitor (Eq. 6). The capacitance, C, is related to the frequency dependent dielectric constant, k, the permittivity of free space, $\varepsilon 0$, the area, A, of the parallel plate electrodes, and the thickness of the dielectric spacer, d.

$$C = \frac{k\varepsilon_0 A}{d} \quad \text{(Eq. 6)}$$

For five atom percent GZO at $\lambda$=379 nm, k=1.57. Assuming the filter is one square inch in size, A=6.452×10$^{-4}$ m$^2$. An exemplary filter design features the electrodes separated by d=100 nm. Inserting these values into (Eq. 6), C=87.7 nF. If inserted into bias circuitry with a standard resistance of R=50$\Omega$, the charge (and discharge) time of the capacitor, is 5$\tau$=22.42 $\mu$s. This represents the fastest time over which the wavelength can be tuned. With a tightly regulated and stable voltage source, the wavelength can be repeatedly tuned to the same wavelength as necessary.

$$\tau = RC \quad \text{(Eq.7)}$$

Various embodiments provide an electrically tunable wavelength selection filter in which a wavelength selection filter and an order sorting filter as described herein are implemented on a common substrate. Various embodiments provide an electrically tunable wavelength selection filter in which a wavelength selection filter and an order sorting filter as described herein are implemented on different substrates or mechanical supports, and disposed proximate each other to achieve the various functions described herein. Various embodiments an electrically tunable wavelength selection filter in which a wavelength selection filter and an order sorting filter as described herein are implemented on different substrates or mechanical supports, and mechanically arranged with respect to each other in a manner enabling the various functions described herein.

Various embodiments provide an electrically tunable wavelength selection filter in which the dielectric thickness m>1 and, in fact, may be several multiples of m=1. It is noted that a thickness of m>1 for a defect cavity is relatively large and finds utility within the context of the structures defined herein. Other structures, such as a capacitor having a refractive index beyond what is described within the context of the various embodiments may enable embodiments in which the order sorting filter is less important or eliminated. Various embodiments contemplate the use of the capacitor as the defect cavity. Further embodiments contemplate the use of other devices for this purpose, such as an inductor or resistor or transistor or other electrically operative structure or combination thereof wherein application of an electric potential or charge current applied thereto causes the electrically operative structure to control light traversing the wavelength selection filter.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An electrically tunable wavelength selection filter, comprising:
   a wavelength selection filter substantially transparent to frequencies of interest, the wavelength selection filter comprising a substrate having disposed thereon a multilayer stack including alternating thin films of, respectively, first and second dielectric materials wherein a refractive index of the second dielectric material is different than a refractive index of the first dielectric material and a refractive index of the substrate, and a capacitor disposed between the multilayer stack and an additional thin film layer of said second dielectric material, the capacitor having first and second electrodes separated by a dielectric material, whereby light traversing the wavelength selection filter may be controlled by the application of an electric potential between said first and second electrodes; and an order sorting filter substantially transparent to frequencies of interest, proximate and electrically isolated from said wavelength selection filter, comprising a second multilayer stack including alternating thin films of, respectively, third and first dielectric materials wherein a refractive index of the first dielectric material is substantially the same as the refractive index of the third dielectric material, a control electrode disposed between and in electrical contact with said layers of said second multilayer stack, and a plurality of ground electrodes disposed on layer pairs of said second multilayer stack such that at least one of said ground electrodes is in electrical contact with each layer surface, whereby light traversing the filter may be controlled by the application of an electric potential between said control electrodes and said ground electrodes.

2. The electrically tunable wavelength selection filter of claim 1, wherein the order sorting filter is disposed upon a second side of the substrate.

3. The electrically tunable wavelength selection filter of claim 1, wherein said additional thin film layer of said second dielectric material comprises an initial layer of a second multilayer stack including alternating thin films of, respectively, second and first dielectric materials.

4. The electrically tunable wavelength selection filter of claim 1, wherein the substrate comprises any of borosilicate glass, sapphire, indium phosphide, silicon, germanium, fused silica, calcium fluoride, zinc selenide, magnesium fluoride, spinel ($MgAl_2O_4$), barium fluoride, AMTIR (Ge-AsSe) and gallium arsenide (GaAs).

5. The electrically tunable wavelength selection filter of claim 1, wherein the first dielectric material comprises lithium fluoride, and the second dielectric material comprises gallium arsenide.

6. The electrically tunable wavelength selection filter of claim 1, wherein the capacitor electrodes are five atom percent doped gallium-zinc oxide.

7. The electrically tunable wavelength selection filter of claim 1, where the dielectric material separating the capacitor electrodes is aluminum oxide.

8. The electrically tunable wavelength selection filter of claim 1, wherein the first dielectric material comprises any of aluminum oxide, Group I and IIA fluorides, organic polymers, polystyrene, polyethylene, and other aliphatic polymers, and the second dielectric material comprises any of gallium arsenide, indium arsenide, lithium niobate, III-V compounds or II-VI compounds.

9. The electrically tunable wavelength selection filter of claim 1, wherein the capacitor electrodes comprise at least one of a transparent conductive oxide and a conducting polymers.

10. The electrically tunable wavelength selection filter of claim 1, wherein the capacitor electrodes comprise any of indium-tin oxide, gallium-tin oxide, gallium-zinc oxide, aluminum-zinc oxide, zinc rare-earth oxide, titanium dioxide.

11. The electrically tunable wavelength selection filter of claim 1, wherein the capacitor electrodes comprise any of a poly(platinum acetylide), poly(phenylene ethylene sulfonate), poly(fluoride), poly(vinyl carbazole), doped polyacetylene, doped polythiophene, and poly(methylhexyl phenylene vinylene).

12. The electrically tunable wavelength selection filter of claim 1, wherein the capacitor electrodes comprise a conjugated polymer and wherein a dopant for the conjugated organic polymer is selected from a group consisting of tetrafluoroborate, perchlorate, chloride, bromide, iodide, sodium, tetra-n-butylamine, and photodoping.

13. The electrically tunable wavelength selection filter of claim 1, wherein the dielectric material separating the first and second electrodes of the capacitor comprises any of a Group I and IIA fluoride, an organic polymer and an aliphatic polymer.

14. The electrically tunable wavelength selection filter of claim 1, wherein the dielectric material separating the first and second electrodes of the capacitor comprises any of a single crystal of sapphire, silicon, gallium arsenide, lanthanum aluminate, yttria stabilized zirconia, or germanium.

15. The electrically tunable wavelength selection filter of claim 1 operating without an order sorting filter proximate to the wavelength selection filter.

16. Apparatus, comprising:
a wavelength selection filter substantially transparent to frequencies of interest, the wavelength selection filter comprising a substrate having disposed thereon a multilayer stack including alternating thin films of, respectively, first and second dielectric materials wherein a refractive index of the second dielectric material is different than a refractive index of the first dielectric material and a refractive index of the substrate, and a defect cavity comprising an electrically operable structure formed thereat, whereby light traversing the wavelength selection filter may be controlled by the application of electric stimuli to the electrically operable structure of the defect cavity;

an order sorting filter substantially transparent to frequencies of interest, proximate and electrically isolated from said wavelength selection filter, comprising a second multilayer stack including alternating thin films of, respectively, third and first dielectric materials wherein a refractive index of the first dielectric material is substantially the same as the refractive index of the third dielectric material, a control electrode disposed between and in electrical contact with said layers of said second multilayer stack, and a plurality of ground electrodes disposed on layer pairs of said second multilayer stack such that at least one of said ground electrodes is in electrical contact with each layer surface, whereby light traversing the wavelength section filter may be controlled by the application of an electric potential or charge current between said control electrodes and said ground electrodes.

17. The apparatus of claim 16, wherein the electrically operable structure of the defect cavity comprises a capacitor disposed between the multilayer stack and an additional thin film layer of said second dielectric material, the capacitor having first and second electrodes separated by a dielectric material, whereby light traversing the wavelength selection filter may be controlled by the application of an electric potential between said first and second electrodes.

18. The apparatus of claim 16, wherein the electrically operable structure of the defect cavity comprises at least one of a resistor, an inductor and a capacitor.

* * * * *